(12) United States Patent
Moulin et al.

(10) Patent No.: US 11,358,497 B2
(45) Date of Patent: Jun. 14, 2022

(54) TRACK SYSTEM HAVING A ROLLING MEMBER

(71) Applicant: Lear Corporation, Southfield, MI (US)

(72) Inventors: Antoine Moulin, Aurec-sur-Loire (FR); Jose Gabriel Fernández Bañares, Valls (ES); Raúl Ricart, Valls (ES)

(73) Assignee: Lear Corporation, Southfield, MI (US)

( * ) Notice: Subject to any disclaimer, the term of this patent is extended or adjusted under 35 U.S.C. 154(b) by 72 days.

(21) Appl. No.: 16/812,762

(22) Filed: Mar. 9, 2020

(65) Prior Publication Data

US 2020/0207241 A1 Jul. 2, 2020

Related U.S. Application Data

(63) Continuation-in-part of application No. 16/399,116, filed on Apr. 30, 2019, now Pat. No. 11,040,638,
(Continued)

(30) Foreign Application Priority Data

May 4, 2018 (FR) ........................................ 1853891
May 4, 2018 (FR) ........................................ 1853892
(Continued)

(51) Int. Cl.
 *F16M 11/00* (2006.01)
 *B60N 2/07* (2006.01)
(Continued)

(52) U.S. Cl.
 CPC ......... *B60N 2/0732* (2013.01); *B60N 2/0715* (2013.01); *B60N 2/0722* (2013.01);
(Continued)

(58) Field of Classification Search
 CPC .. B60N 2/0722; B60N 2/0732; B60N 2/0715; B60N 2/933; B60N 2/0806;
(Continued)

(56) References Cited

U.S. PATENT DOCUMENTS 2,126,143 A 8/1938 McGregor
2,263,554 A 11/1941 Brach
(Continued)

FOREIGN PATENT DOCUMENTS

CN 203190203 U 9/2013
CN 203799201 U 8/2014
(Continued)

OTHER PUBLICATIONS

Co-Pending U.S. Appl. No. 16/597,187, filed Oct. 9, 2019.
(Continued)

*Primary Examiner* — Amy J. Sterling
(74) *Attorney, Agent, or Firm* — Fishman Stewart PLLC

(57) ABSTRACT

A support member may be configured for selective connection with and removal from track assemblies. A support member may include a body and a rolling member rotatably connected to the body to facilitate movement of the support member along a track. The rolling member may include a grooved configuration to limit movement of the support member relative to said track in a Y-direction. The rolling member may include a groove configured to engage a protrusion or ridge of said track. The rolling member may include a first portion and a second portion separated in an axial direction by the groove.

20 Claims, 13 Drawing Sheets

Related U.S. Application Data which is a continuation-in-part of application No. 16/131,360, filed on Sep. 14, 2018, now Pat. No. 10,759,308, and a continuation-in-part of application No. 16/131,415, filed on Sep. 14, 2018, now Pat. No. 10,562,414, and a continuation-in-part of application No. 16/131,404, filed on Sep. 14, 2018, now Pat. No. 10,850,644, and a continuation-in-part of application No. 16/131,614, filed on Sep. 14, 2018, now Pat. No. 10,850,645, which is a continuation of application No. 16/131,384, filed on Sep. 14, 2018, now Pat. No. 10,889,208, application No. 16/812,762, which is a continuation-in-part of application No. 16/399,179, filed on Apr. 30, 2019, now Pat. No. 10,926,667, which is a continuation-in-part of application No. 16/131,360, filed on Sep. 14, 2018, now Pat. No. 10,759,308, and a continuation-in-part of application No. 16/131,415, filed on Sep. 14, 2018, now Pat. No. 10,562,414, and a continuation-in-part of application No. 16/131,404, filed on Sep. 14, 2018, now Pat. No. 10,850,644, and a continuation-in-part of application No. 16/131,614, filed on Sep. 14, 2018, now Pat. No. 10,850,645, application No. 16/812,762, which is a continuation-in-part of application No. 16/399,209, filed on Apr. 30, 2019, now Pat. No. 10,906,431, which is a continuation-in-part of application No. 16/131,360, filed on Sep. 14, 2018, now Pat. No. 10,759,308, and a continuation-in-part of application No. 16/131,415, filed on Sep. 14, 2018, now Pat. No. 10,562,414, and a continuation-in-part of application No. 16/131,404, filed on Sep. 14, 2018, now Pat. No. 10,850,644, and a continuation-in-part of application No. 16/131,614, filed on Sep. 14, 2018, now Pat. No. 10,850,645, application No. 16/812,762, which is a continuation-in-part of application No. 16/399,164, filed on Apr. 30, 2019, now Pat. No. 11,040,639, which is a continuation-in-part of application No. 16/131,360, filed on Sep. 14, 2018, now Pat. No. 10,759,308, and a continuation-in-part of application No. 16/131,415, filed on Sep. 14, 2018, now Pat. No. 10,562,414, and a continuation-in-part of application No. 16/131,404, filed on Sep. 14, 2018, now Pat. No. 10,850,644, and a continuation-in-part of application No. 16/131,614, filed on Sep. 14, 2018, now Pat. No. 10,850,645, application No. 16/812,762, which is a continuation-in-part of application No. 16/296,379, filed on Mar. 8, 2019, now Pat. No. 10,882,420.

(60) Provisional application No. 62/979,812, filed on Feb. 21, 2020.

(30) Foreign Application Priority Data

May 4, 2018 (FR) ...................................... 1853893
May 4, 2018 (FR) ...................................... 1853894

(51) Int. Cl.
| | | |
|---|---|---|
| *B60N 2/54* | (2006.01) | |
| *B60N 2/50* | (2006.01) | |
| *B60N 2/08* | (2006.01) | |
| *B60N 2/20* | (2006.01) | |
| *B60R 22/22* | (2006.01) | |
| *B60N 2/90* | (2018.01) | |

(52) U.S. Cl.
CPC ......... *B60N 2/0806* (2013.01); *B60N 2/0818* (2013.01); *B60N 2/0843* (2013.01); *B60N 2/20* (2013.01); *B60N 2/502* (2013.01); *B60N 2/54* (2013.01); *B60N 2/933* (2018.02); *B60R 22/22* (2013.01)

(58) Field of Classification Search
CPC ...... B60N 2/0818; B60N 2/0843; B60N 2/20; B60N 2/502; B60N 2/54
See application file for complete search history.

(56) References Cited

U.S. PATENT DOCUMENTS

| | | |
|---|---|---|
| 2,480,622 A | 8/1949 | Warnock |
| 2,678,082 A | 5/1954 | Nathan |
| 3,181,102 A | 4/1965 | Fehr |
| 3,213,403 A | 10/1965 | Hermann |
| 3,268,848 A | 8/1966 | Adams |
| 3,940,182 A | 2/1976 | Tamura |
| 4,020,769 A | 5/1977 | Keir |
| 4,198,025 A | 4/1980 | Lowe et al. |
| 4,243,248 A | 1/1981 | Scholz et al. |
| 4,282,631 A | 8/1981 | Uehara et al. |
| 4,511,187 A | 4/1985 | Rees |
| 4,575,295 A | 3/1986 | Rebentisch |
| 4,618,808 A | 10/1986 | Ish-Shalom et al. |
| 4,633,615 A * | 1/1987 | Moose ................ E05D 15/0669 16/100 |
| 4,707,030 A | 11/1987 | Harding |
| 4,711,589 A | 12/1987 | Goodbred |
| 4,763,360 A | 8/1988 | Daniels et al. |
| 4,776,809 A | 10/1988 | Hall |
| 4,830,531 A | 5/1989 | Condit et al. |
| 4,853,555 A | 8/1989 | Wheat |
| 4,961,559 A | 10/1990 | Raymor |
| 4,969,621 A | 11/1990 | Munchow et al. |
| 4,987,316 A | 1/1991 | White et al. |
| 5,137,331 A | 8/1992 | Colozza |
| 5,167,393 A | 12/1992 | Hayakawa et al. |
| 5,188,329 A | 2/1993 | Takahara |
| 5,192,045 A | 3/1993 | Yamada et al. |
| 5,222,814 A | 6/1993 | Boelryk |
| 5,322,982 A | 6/1994 | Leger et al. |
| 5,332,290 A | 7/1994 | Borlinghaus et al. |
| 5,348,373 A | 9/1994 | Stiennon |
| 5,362,241 A | 11/1994 | Matsuoka et al. |
| 5,446,442 A | 8/1995 | Swart et al. |
| 5,466,892 A | 11/1995 | Howard et al. |
| 5,489,173 A | 2/1996 | Hofle |
| 5,582,381 A | 12/1996 | Graf et al. |
| 5,599,086 A | 2/1997 | Dutta |
| 5,618,192 A | 4/1997 | Drury |
| 5,655,816 A | 8/1997 | Magnuson et al. |
| 5,676,341 A | 10/1997 | Tarusawa et al. |
| 5,696,409 A | 12/1997 | Handman et al. |
| 5,701,037 A | 12/1997 | Weber et al. |
| 5,796,177 A | 8/1998 | Werbelow et al. |
| 5,800,015 A | 9/1998 | Tsuchiya et al. |
| 5,899,532 A | 5/1999 | Paisley et al. |
| 5,918,847 A | 7/1999 | Couasnon |
| 5,921,606 A | 7/1999 | Moradell et al. |
| 5,927,017 A * | 7/1999 | Jacobs ................ E05D 15/0673 49/410 |
| 5,964,442 A | 10/1999 | Wingblad et al. |
| 5,964,815 A | 10/1999 | Wallace et al. |
| 6,036,157 A | 3/2000 | Baroin et al. |
| 6,142,718 A | 11/2000 | Kroll |
| 6,150,774 A | 11/2000 | Mueller et al. |
| 6,166,451 A | 12/2000 | Pigott |
| 6,216,995 B1 | 4/2001 | Koester |
| 6,227,595 B1 | 5/2001 | Hamelin et al. |
| 6,290,516 B1 | 9/2001 | Gerber |
| 6,296,498 B1 | 10/2001 | Ross |
| 6,299,230 B1 | 10/2001 | Oettl |
| 6,318,802 B1 | 11/2001 | Sjostrom et al. |
| 6,357,814 B1 | 3/2002 | Boisset et al. |
| 6,400,259 B1 | 6/2002 | Bourcart et al. |
| 6,405,988 B1 | 6/2002 | Taylor et al. |

(56) References Cited

U.S. PATENT DOCUMENTS

| | | |
|---|---|---|
| 6,422,596 B1 | 7/2002 | Fendt et al. |
| 6,439,531 B1 | 8/2002 | Severini et al. |
| 6,480,144 B1 | 11/2002 | Miller et al. |
| 6,693,368 B2 | 2/2004 | Schumann et al. |
| 6,710,470 B2 | 3/2004 | Bauer et al. |
| 6,719,350 B2 | 4/2004 | Duchateau et al. |
| 6,736,458 B2 | 5/2004 | Chabanne et al. |
| 6,772,056 B2 | 8/2004 | Mattes et al. |
| 6,805,375 B2 | 10/2004 | Enders et al. |
| 6,851,708 B2 | 2/2005 | Kazmierczak |
| 6,882,162 B2 | 4/2005 | Schirmer et al. |
| 6,960,993 B2 | 11/2005 | Mattes et al. |
| 7,042,342 B2 | 5/2006 | Luo et al. |
| 7,083,437 B2 | 8/2006 | Mackness |
| 7,086,874 B2 | 8/2006 | Mitchell et al. |
| 7,113,541 B1 | 9/2006 | Lys et al. |
| 7,159,899 B2 | 1/2007 | Nitschke et al. |
| 7,170,192 B2 | 1/2007 | Kazmierczak |
| 7,188,805 B2 | 3/2007 | Henley et al. |
| 7,207,541 B2 | 4/2007 | Frohnhaus et al. |
| 7,271,501 B2 | 9/2007 | Dukart et al. |
| 7,288,009 B2 | 10/2007 | Lawrence et al. |
| 7,293,831 B2 | 11/2007 | Greene |
| 7,300,091 B2 | 11/2007 | Nihonmatsu et al. |
| 7,322,605 B2 | 1/2008 | Ventura et al. |
| 7,348,687 B2 | 3/2008 | Aichriedler et al. |
| 7,363,194 B2 | 4/2008 | Schlick et al. |
| 7,370,831 B2 | 5/2008 | Laib et al. |
| 7,388,466 B2 | 6/2008 | Ghabra et al. |
| 7,389,960 B2 | 6/2008 | Mitchell et al. |
| 7,416,042 B2 | 8/2008 | Czaykowska et al. |
| 7,434,883 B2 | 10/2008 | Deptolla |
| 7,454,170 B2 | 11/2008 | Goossens et al. |
| 7,455,535 B2 | 11/2008 | Insalaco et al. |
| 7,503,522 B2 | 3/2009 | Henley et al. |
| 7,505,754 B2 | 3/2009 | Kazmierczak et al. |
| 7,520,090 B2 * | 4/2009 | Gerhart ............... E05D 15/0665 49/411 |
| 7,523,913 B2 | 4/2009 | Mizuno et al. |
| 7,556,233 B2 | 7/2009 | Gryp et al. |
| 7,560,827 B2 | 7/2009 | Jacas-Miret et al. |
| 7,633,301 B2 | 12/2009 | Steenwyk et al. |
| 7,661,637 B2 | 2/2010 | Mejuhas et al. |
| 7,665,939 B1 | 2/2010 | Cardona |
| 7,739,820 B2 | 6/2010 | Frank |
| 7,744,386 B1 | 6/2010 | Speidel et al. |
| 7,779,578 B2 * | 8/2010 | Gray ........................ E06B 3/01 49/506 |
| 7,980,525 B2 | 7/2011 | Kostin |
| 7,980,798 B1 | 7/2011 | Kuehn et al. |
| 8,010,255 B2 | 8/2011 | Darraba |
| 8,146,991 B2 | 4/2012 | Stanz et al. |
| 8,278,840 B2 | 10/2012 | Logiudice et al. |
| 8,282,326 B2 | 10/2012 | Krostue et al. |
| 8,376,675 B2 | 2/2013 | Schulze et al. |
| 8,463,501 B2 | 6/2013 | Jousse |
| 8,536,928 B1 | 9/2013 | Gagne et al. |
| 8,648,613 B2 | 2/2014 | Ewerhart et al. |
| 8,702,170 B2 | 4/2014 | Abraham et al. |
| 8,757,720 B2 | 6/2014 | Hurst, III et al. |
| 8,800,949 B2 | 8/2014 | Schebaum et al. |
| 8,857,778 B2 | 10/2014 | Nonomiya |
| 8,936,526 B2 | 1/2015 | Boutouil et al. |
| 8,967,719 B2 | 3/2015 | Ngiau et al. |
| RE45,456 E | 4/2015 | Sinclair et al. |
| 9,010,712 B2 | 4/2015 | Gray et al. |
| 9,018,869 B2 | 4/2015 | Yuasa et al. |
| 9,045,061 B2 | 6/2015 | Kostin et al. |
| 9,162,590 B2 | 10/2015 | Nagura et al. |
| 9,174,604 B2 | 11/2015 | Wellhoefer et al. |
| 9,242,580 B2 | 1/2016 | Schebaum et al. |
| 9,318,922 B2 | 4/2016 | Hall et al. |
| 9,340,125 B2 | 5/2016 | Stutika et al. |
| 9,346,428 B2 | 5/2016 | Bortolin |
| 9,422,058 B2 | 8/2016 | Fischer et al. |
| 9,533,529 B2 | 1/2017 | Cervello et al. |
| 9,561,770 B2 | 2/2017 | Sievers et al. |
| 9,610,862 B2 | 4/2017 | Bonk et al. |
| 9,663,232 B1 | 5/2017 | Porter et al. |
| 9,673,583 B2 | 6/2017 | Hudson et al. |
| 9,701,217 B2 | 7/2017 | Eckenroth et al. |
| 9,731,628 B1 | 8/2017 | Rao et al. |
| 9,758,061 B2 | 9/2017 | Pluta et al. |
| 9,789,834 B2 | 10/2017 | Rapp et al. |
| 9,796,304 B2 | 10/2017 | Salter et al. |
| 9,815,425 B2 | 11/2017 | Rao et al. |
| 9,821,681 B2 | 11/2017 | Rao et al. |
| 9,840,220 B2 | 12/2017 | Van Buskirk et al. |
| 9,919,624 B2 | 3/2018 | Cziomer et al. |
| 9,950,682 B1 | 4/2018 | Gramenos et al. |
| 10,059,232 B2 | 8/2018 | Frye et al. |
| 10,160,351 B2 | 12/2018 | Sugimoto et al. |
| 10,308,145 B2 | 6/2019 | Cziomer et al. |
| 10,479,227 B2 | 11/2019 | Nolte et al. |
| 10,493,243 B1 | 12/2019 | Braham |
| 10,547,135 B2 | 1/2020 | Sugiura |
| 10,549,659 B2 | 2/2020 | Sullivan et al. |
| 10,654,378 B2 | 5/2020 | Pons |
| 2002/0056798 A1 | 5/2002 | Eguchi et al. |
| 2005/0046367 A1 | 3/2005 | Wevers et al. |
| 2005/0089367 A1 | 4/2005 | Sempliner |
| 2005/0150705 A1 | 7/2005 | Vincent et al. |
| 2005/0211835 A1 | 9/2005 | Henley et al. |
| 2005/0215098 A1 | 9/2005 | Muramatsu et al. |
| 2005/0230543 A1 | 10/2005 | Laib et al. |
| 2005/0258676 A1 | 11/2005 | Mitchell et al. |
| 2006/0131470 A1 | 6/2006 | Kamada et al. |
| 2006/0208549 A1 | 9/2006 | Hancock et al. |
| 2006/0220411 A1 | 10/2006 | Pathak et al. |
| 2008/0021602 A1 | 1/2008 | Kingham et al. |
| 2008/0084085 A1 | 4/2008 | Mizuno et al. |
| 2008/0090432 A1 | 4/2008 | Patterson et al. |
| 2009/0014584 A1 | 1/2009 | Rudduck et al. |
| 2009/0129105 A1 | 5/2009 | Kusu et al. |
| 2009/0251920 A1 | 10/2009 | Kino et al. |
| 2009/0302665 A1 | 12/2009 | Dowty |
| 2009/0319212 A1 | 12/2009 | Cech et al. |
| 2010/0117275 A1 | 5/2010 | Nakamura |
| 2011/0024595 A1 | 2/2011 | Oi et al. |
| 2012/0112032 A1 | 5/2012 | Kohen |
| 2013/0020459 A1 | 1/2013 | Moriyama et al. |
| 2013/0035994 A1 | 2/2013 | Pattan et al. |
| 2014/0263920 A1 | 9/2014 | Anticuar et al. |
| 2014/0265479 A1 | 9/2014 | Bennett |
| 2015/0048206 A1 | 2/2015 | Deloubes |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1 | 8/2015 | Davidson, Jr. et al. |
| 2015/0337582 A1 * | 11/2015 | Halfon ..................... F03D 9/16 16/97 |
| 2016/0039314 A1 | 2/2016 | Anticuar et al. |
| 2016/0154170 A1 | 6/2016 | Thompson et al. |
| 2016/0236613 A1 | 8/2016 | Trier |
| 2017/0080825 A1 | 3/2017 | Bonk et al. |
| 2017/0080826 A1 | 3/2017 | Bonk et al. |
| 2017/0166093 A1 | 6/2017 | Cziomer et al. |
| 2017/0261343 A1 | 9/2017 | Lanter et al. |
| 2017/0291507 A1 | 10/2017 | Hattori et al. |
| 2018/0017189 A1 | 1/2018 | Wegner |
| 2018/0039917 A1 | 2/2018 | Buttolo et al. |
| 2018/0086230 A1 | 3/2018 | Kume et al. |
| 2018/0086232 A1 | 3/2018 | Kume |
| 2018/0105072 A1 | 4/2018 | Pons |
| 2018/0148011 A1 | 5/2018 | Zaugg et al. |
| 2018/0183623 A1 | 6/2018 | Schoenfeld et al. |
| 2018/0275648 A1 | 9/2018 | Ramalingam |
| 2019/0001846 A1 | 1/2019 | Jackson et al. |
| 2019/0084453 A1 | 3/2019 | Petit et al. |
| 2019/0126786 A1 | 5/2019 | Dry et al. |
| 2019/0337413 A1 | 11/2019 | Romer |
| 2019/0337414 A1 | 11/2019 | Condamin et al. |
| 2019/0337415 A1 | 11/2019 | Condamin et al. |
| 2019/0337416 A1 | 11/2019 | Condamin et al. |

(56) References Cited

U.S. PATENT DOCUMENTS

| | | |
|---|---|---|
| 2019/0337417 A1 | 11/2019 | Condamin et al. |
| 2019/0337418 A1 | 11/2019 | Condamin et al. |
| 2019/0337419 A1 | 11/2019 | Condamin et al. |
| 2019/0337420 A1 | 11/2019 | Condamin et al. |
| 2019/0337421 A1 | 11/2019 | Condamin et al. |
| 2019/0337422 A1 | 11/2019 | Condamin et al. |
| 2019/0337471 A1 | 11/2019 | Brehm |
| 2019/0379187 A1 | 12/2019 | Christensen et al. |
| 2019/0389336 A1 | 12/2019 | Malinowski et al. |
| 2020/0009995 A1 | 1/2020 | Sonar |
| 2020/0055423 A1 | 2/2020 | Prozzi et al. |
| 2020/0079244 A1 | 3/2020 | Carbone et al. |
| 2020/0180516 A1 | 6/2020 | Moulin |
| 2020/0180517 A1 | 6/2020 | Moulin |
| 2020/0189504 A1 | 6/2020 | Ricart et al. |
| 2020/0189511 A1 | 6/2020 | Ricart et al. |
| 2020/0194936 A1 | 6/2020 | Ricart et al. |
| 2020/0194948 A1 | 6/2020 | Lammers et al. |
| 2020/0262367 A1 | 8/2020 | Fernandez Banares et al. |
| 2020/0269754 A1 | 8/2020 | Ricart et al. |
| 2020/0282871 A1 | 9/2020 | Ricart et al. |
| 2020/0282880 A1 | 9/2020 | Jones et al. |

FOREIGN PATENT DOCUMENTS

| | | |
|---|---|---|
| CN | 104507703 A | 4/2015 |
| CN | 105264277 A | 1/2016 |
| CN | 206287857 U | 6/2017 |
| CN | 107614316 A | 1/2018 |
| DE | 3710476 A1 | 10/1987 |
| DE | 29712180 U1 | 9/1997 |
| DE | 202005013714 U1 | 12/2005 |
| DE | 102005007430 A1 | 3/2006 |
| DE | 102006022032 A1 | 12/2006 |
| DE | 102010017038 A1 | 2/2011 |
| DE | 102010063615 A1 | 2/2012 |
| DE | 102011056278 A1 | 2/2013 |
| DE | 202014102336 U1 | 6/2014 |
| DE | 102014217754 A1 | 3/2015 |
| DE | 102015212100 A1 | 12/2015 |
| DE | 112015000380 T5 | 10/2016 |
| DE | 102016213444 A1 | 1/2017 |
| DE | 102016113409 A1 | 4/2017 |
| DE | 102016224663 A1 | 6/2017 |
| DE | 102016107306 A1 | 10/2017 |
| EP | 0130275 A2 | 1/1985 |
| EP | 0565973 A1 | 10/1993 |
| EP | 0783990 A1 | 7/1997 |
| EP | 1176047 A1 | 1/2002 |
| EP | 1209024 A1 | 5/2002 |
| EP | 1431104 A2 | 6/2004 |
| EP | 2298609 A2 | 3/2011 |
| EP | 1699661 B1 | 8/2012 |
| EP | 3150426 A1 | 4/2017 |
| FR | 2762814 A1 | 11/1998 |
| FR | 2864481 B1 | 4/2006 |
| FR | 2951329 A1 | 4/2011 |
| FR | 2986751 A1 | 8/2013 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2013230721 A | 11/2013 |
| JP | 2018090053 A | 6/2018 |
| WO | 01/87665 A1 | 11/2001 |
| WO | 2003002256 A2 | 1/2003 |
| WO | 2004098943 A1 | 11/2004 |
| WO | 2005068247 A2 | 7/2005 |

OTHER PUBLICATIONS

Co-Pending U.S. Appl. No. 16/672,989, filed Nov. 4, 2019.
Co-Pending U.S. Appl. No. 16/711,661, filed Dec. 12, 2019.
Chinese Office Action dated Dec. 22, 2021 related to corresponding Chinese Patent Application No. 202010159402.1.
German Office Action dated Jan. 25, 2022 related to corresponding German Patent Application No. 10 2020 202 953.9.

\* cited by examiner

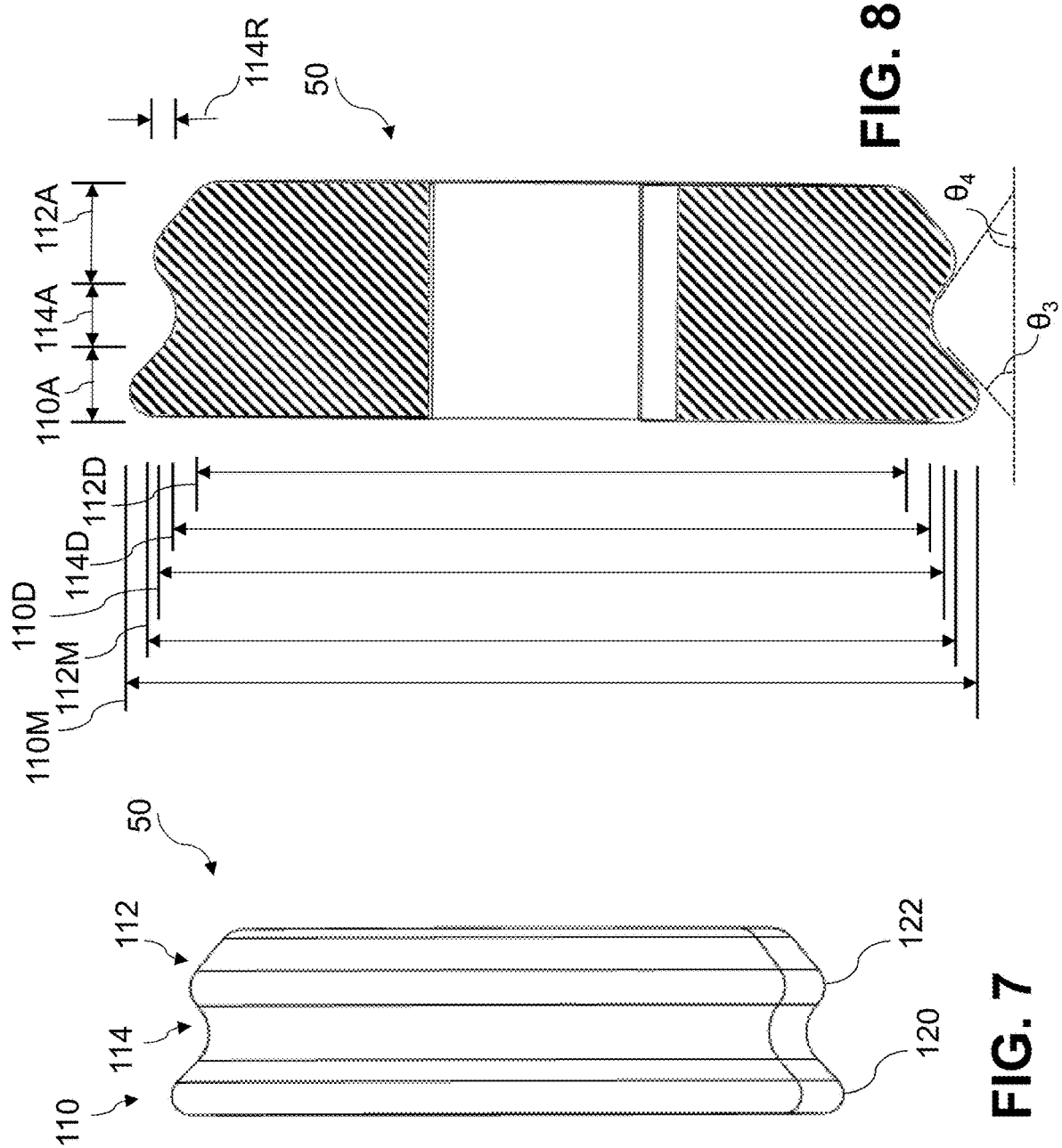

TRACK SYSTEM HAVING A ROLLING MEMBER

CROSS-REFERENCE TO RELATED APPLICATIONS

This application is a continuation-in-part application of U.S. patent application Ser. No. 16/296,379, filed on Mar. 8, 2019.

This application is a continuation-in-part of U.S. patent application Ser. No. 16/399,116, filed Apr. 30, 2019, U.S. patent application Ser. No. 16/399,164, filed Apr. 30, 2019, U.S. patent application Ser. No. 16/399,179, filed Apr. 30, 2019, and U.S. patent application Ser. No. 16/399,209, filed Apr. 30, 2019, all of which are continuation-in-part applications of U.S. patent application Ser. No. 16/131,360, filed Sep. 14, 2018, U.S. patent application Ser. No. 16/131,415, filed Sep. 14, 2018, U.S. patent application Ser. No. 16/131,404, filed Sep. 14, 2018, and U.S. patent application Ser. No. 16/131,614, filed Sep. 14, 2018, which is a continuation of U.S. patent application Ser. No. 16/131,384, filed Sep. 14, 2018.

This application claims the benefit of French Patent Application Serial No. 1853891, filed on May 4, 2018; French Patent Application Serial No. 1853892, filed on May 4, 2018; French Patent Application Serial No. 1853893, filed on May 4, 2018; and French Patent Application Serial No. 1853894, filed on May 4, 2018.

This application claims the benefit of U.S. Provisional Patent Application Ser. No. 62/979,812, filed on Feb. 21, 2020.

The disclosures of all of the above applications are hereby incorporated by reference in their entireties as though fully set forth herein.

TECHNICAL FIELD

The present disclosure generally relates to tracks and rolling members that may be used in connection with track systems, including track systems and rolling members that may, for example, be utilized with vehicles and/or vehicle seats.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track systems are complex, difficult to use, difficult to assemble, are not efficient, and/or do not provide sufficient functionality.

There is a desire for solutions/options that minimize or eliminate one or more challenges or shortcomings of track systems and/or rolling members. The foregoing discussion is intended only to illustrate examples of the present field and is not a disavowal of scope.

SUMMARY

In embodiments, a support member may be configured for selective connection with and removal from track assemblies. A support member may include a body and a rolling member rotatably connected to the body to facilitate movement of the support member along a track. The rolling member may include a grooved configuration to limit movement of the support member relative to said track in a Y-direction. The rolling member may include a groove configured to engage a protrusion or ridge of said track. The rolling member may include a first portion and a second portion separated in an axial direction by the groove.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

FIG. 7 is a side view generally illustrating an embodiment of a rolling member according to teachings of the present disclosure.

FIG. 8 is a cross-sectional view generally illustrating an embodiment of a rolling member according to teachings of the present disclosure.

DETAILED DESCRIPTION

Figure 1:
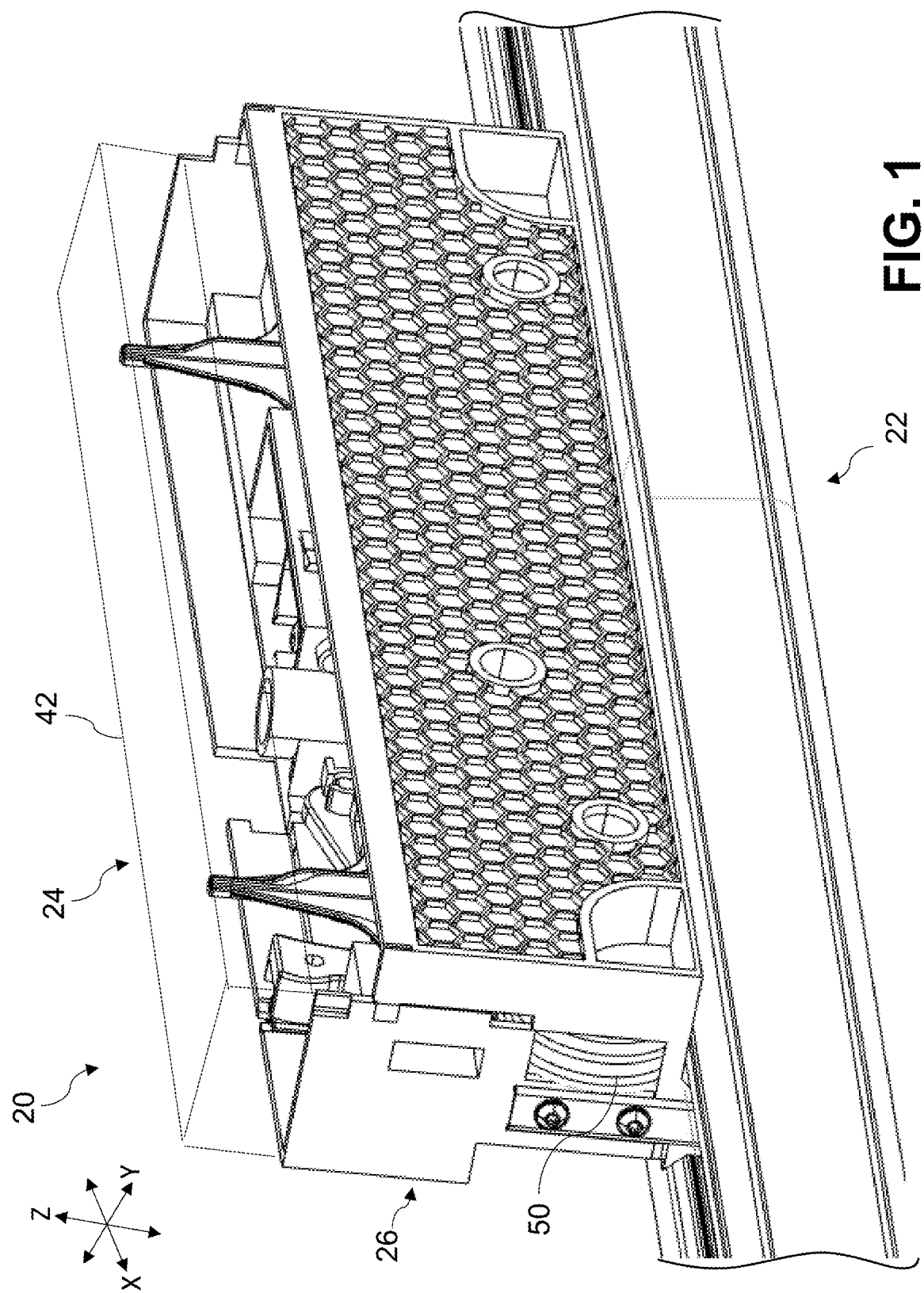
FIG. 1 is a perspective view generally illustrating an embodiment of a track system according to teachings of the present disclosure.
Figure 2:
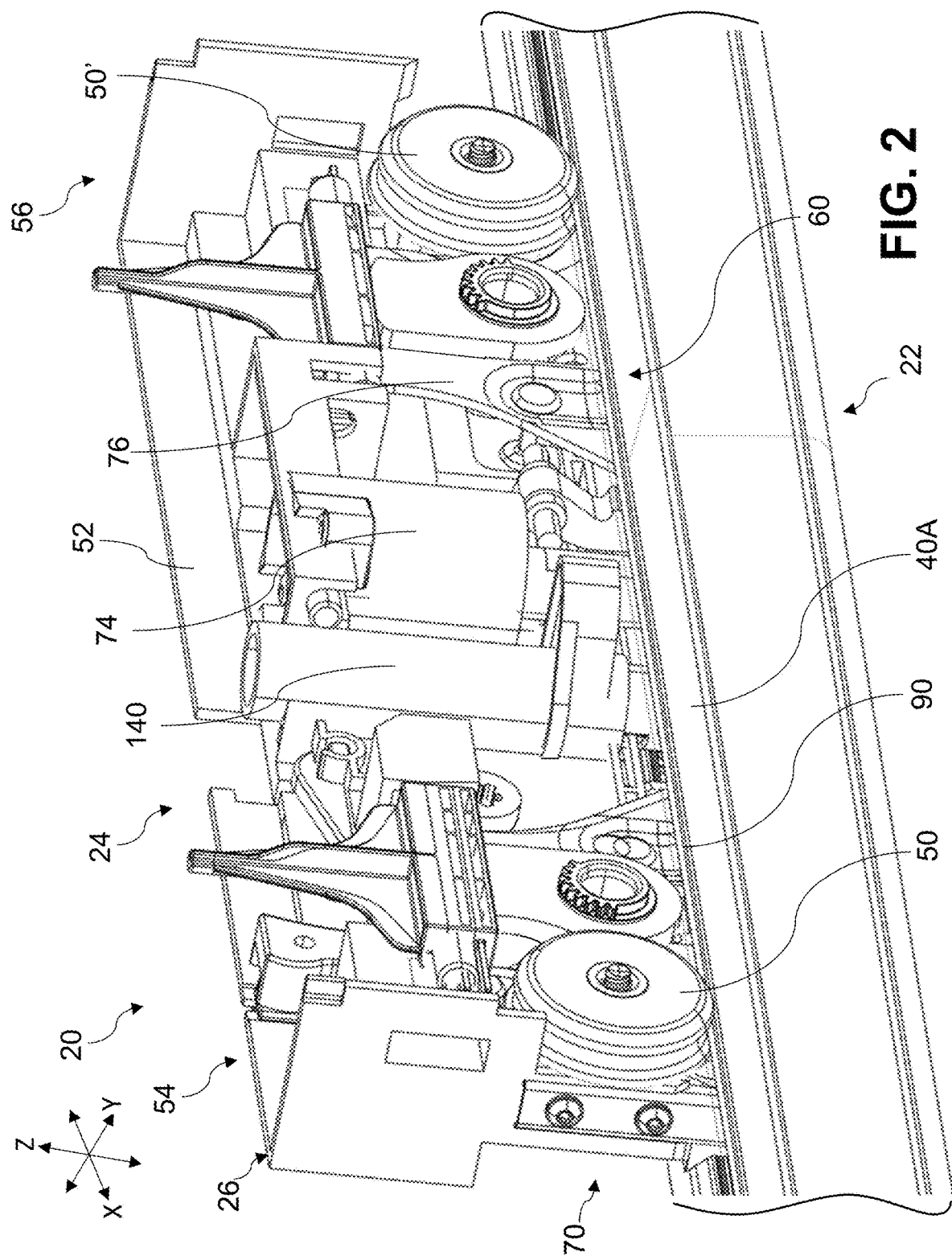
FIG. 2 is a perspective view generally illustrating an embodiment of a track system according to teachings of the present disclosure.

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

In embodiments, such as generally illustrated in FIGS. 1-6B, a track system 20 may include a track assembly 22 and/or a support assembly 24 that may include a support member 26.

With embodiments, such as generally illustrated in FIGS. 3A-6B, a track assembly 22 may include a first track 30 and/or a second track 32. The first track 30 may be configured as an outer track and/or the second track 32 may be configured as an inner track that may be disposed at least partially within the first track 30. The tracks 30, 32 may include or more of a variety of materials. For example and without limitation, the first track 30 may include a first material (e.g., aluminum) that may be relatively light, and/or the second track 32 may include a second material (e.g., steel) that may be relatively strong. The first track 30 may, for example, include a generally U-shaped configuration that may open upward. The second track 32 may, for example, include a generally L-shaped configuration. The support member 26 may move (e.g., roll) along the first track 30 and/or may selectively engage the second track 32 to selectively restrict relative movement between the support assembly 24 and the track assembly 22. Legs 34, 36 of the first track 30, which may extend generally upward from a base 38 of the first track 30, may include T-shaped configurations such that the first track 30 includes a pair of top surfaces 40A, 40B that may be substantially horizontal.

Figure 6A:
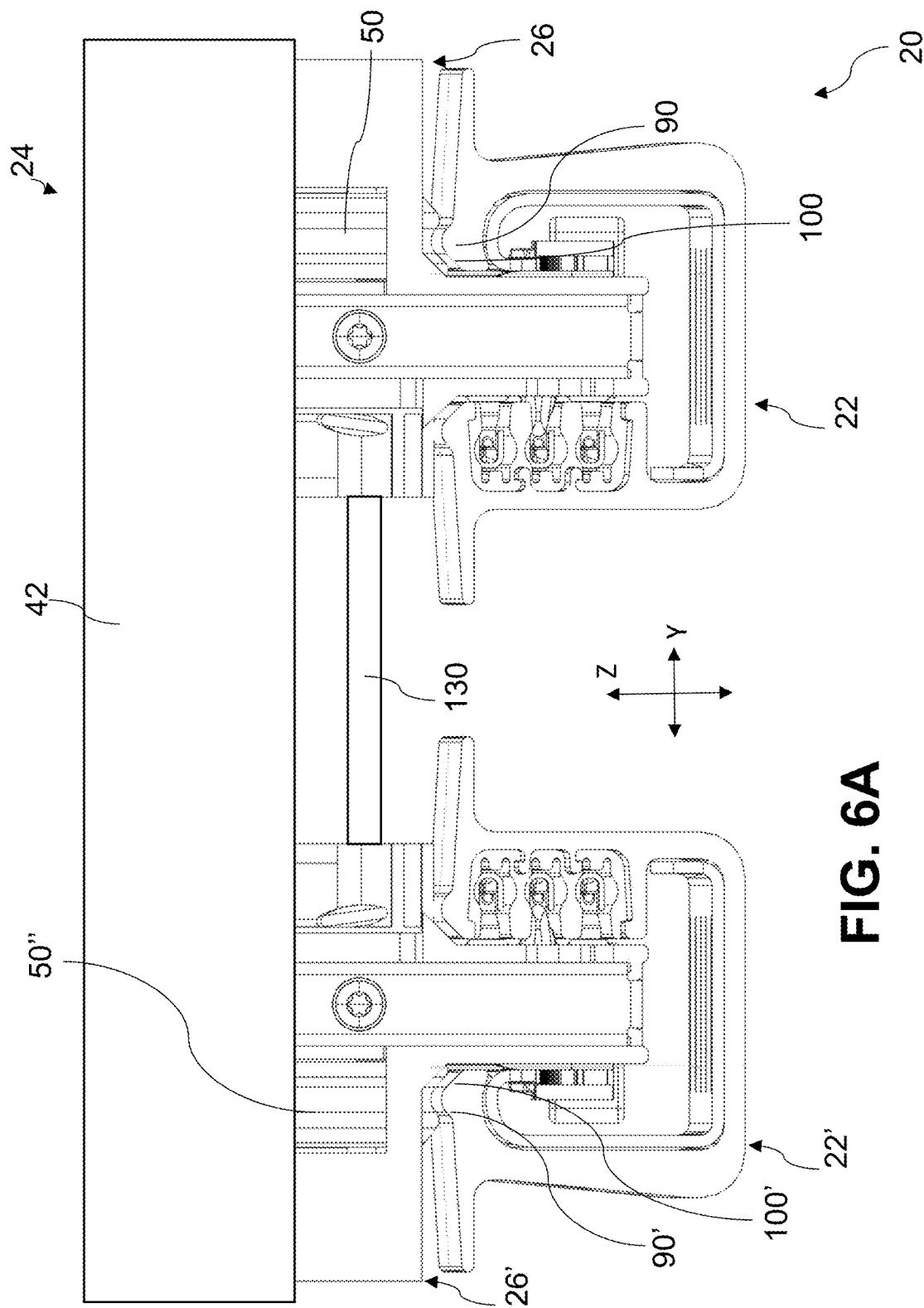
FIGS. 6A and 6B are perspective views generally illustrating embodiments of track systems according to teachings of the present disclosure.
Figure 6B:
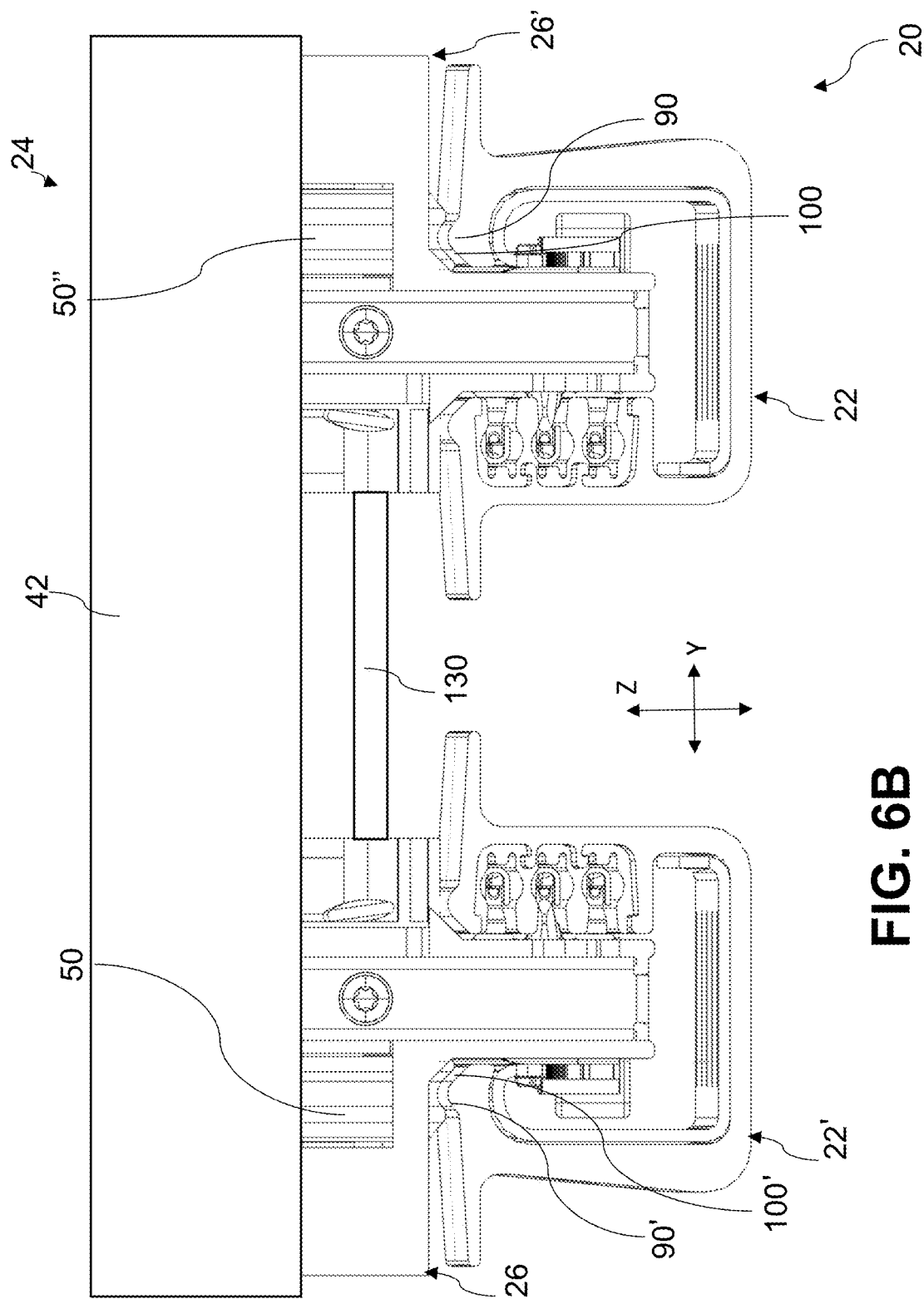
Figure 9B:
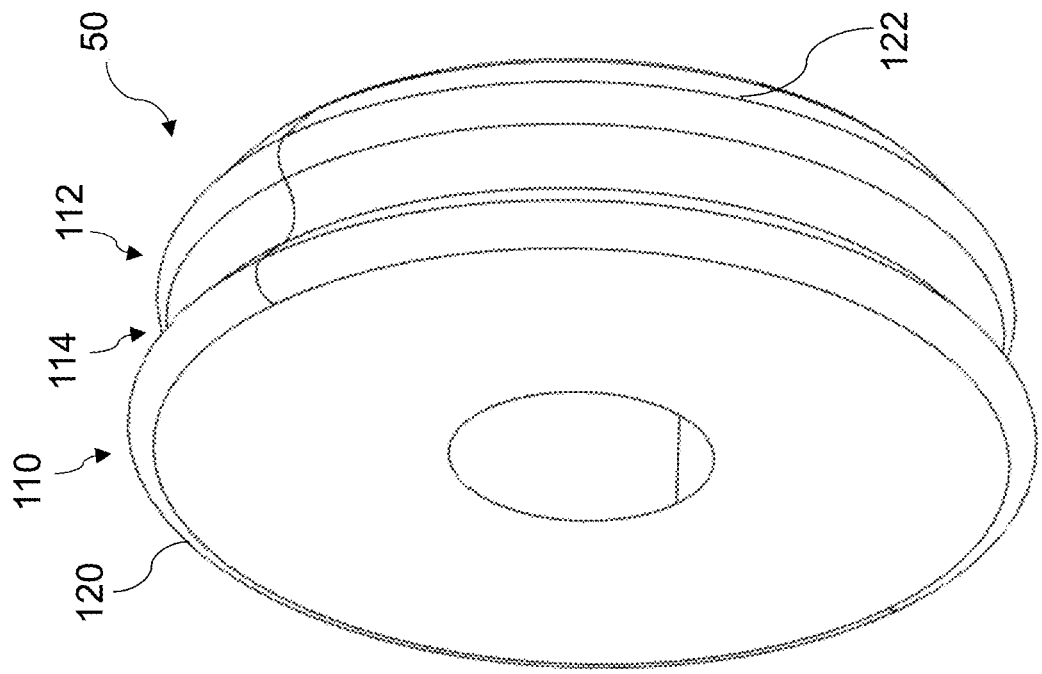
FIGS. 9A and 9B are perspective views generally illustrating embodiments of rolling members according to teachings of the present disclosure.
Figure 9A:
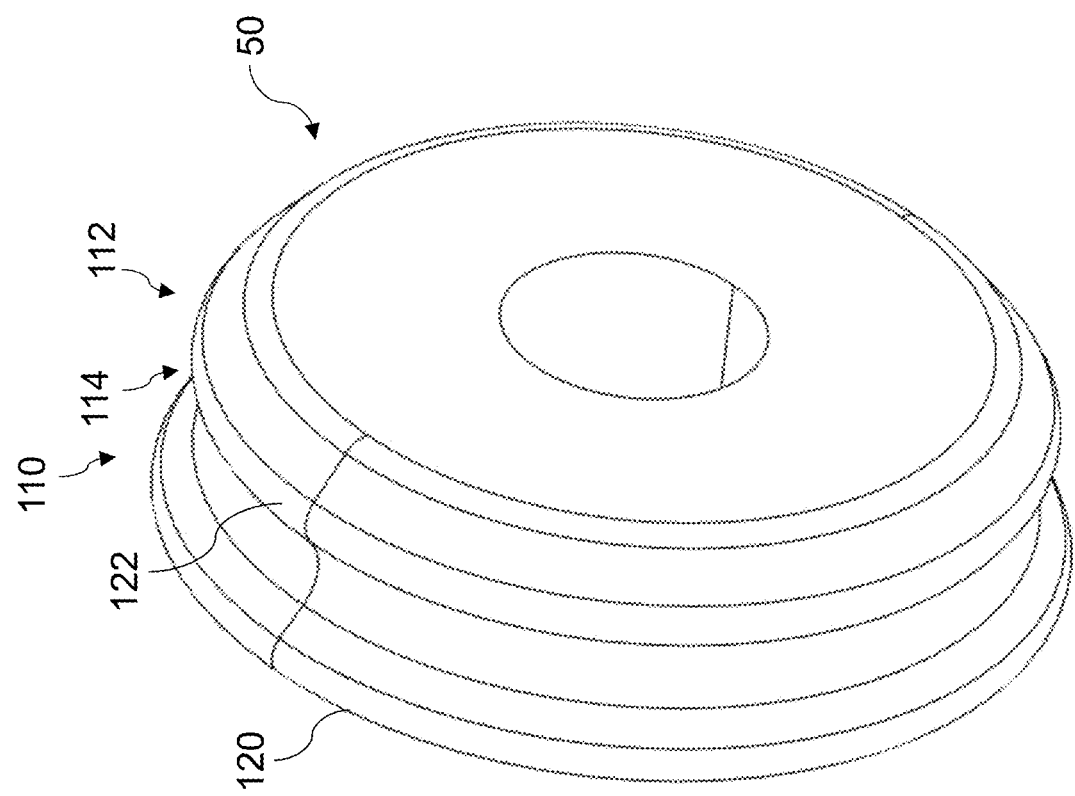

With embodiments, such as generally illustrated in FIGS. 1, 6A, and 6B, a support assembly 24 may include a support member 26 and/or a component 42 that may be connected to and/or supported, at least in part, by the support member 26. The component 42 may, for example and without limitation, include a seat (e.g., a vehicle seat), a console, and/or cargo, among others. The support assembly 24 may be configured for connection with, movement along, and/or removal (e.g., substantially vertical removal) from the track assembly 22. The support assembly 24 may, for example, be configured for connection with and/or removal (from the track assembly 22 in at least three positions.

With embodiments, a support assembly 24 may be configured to move along a track assembly 22, as least in part, via one or more rolling members 50. A rolling member 50 may be rotatably connected to a body 52 of the support member 26. For example and without limitation, a first rolling member 50 may be rotatably connected at or about a first end 54 of the support member 26, and/or a second rolling member 50' may be rotatably connected at or about a second end 56 of the support member 26 (see, e.g., FIG. 2).

In embodiments, a rolling member 50 may be configured to support at least a portion of the support assembly 24. A rolling member 50 may rotate, such as about an axis that may be substantially parallel with a Y-direction, as the support assembly 24 moves along the track assembly 22. In some embodiments, rolling members 50 may be connected to the same lateral side of a support member 26 (e.g., the right side in FIGS. 3B and 3C).

Figure 3A:
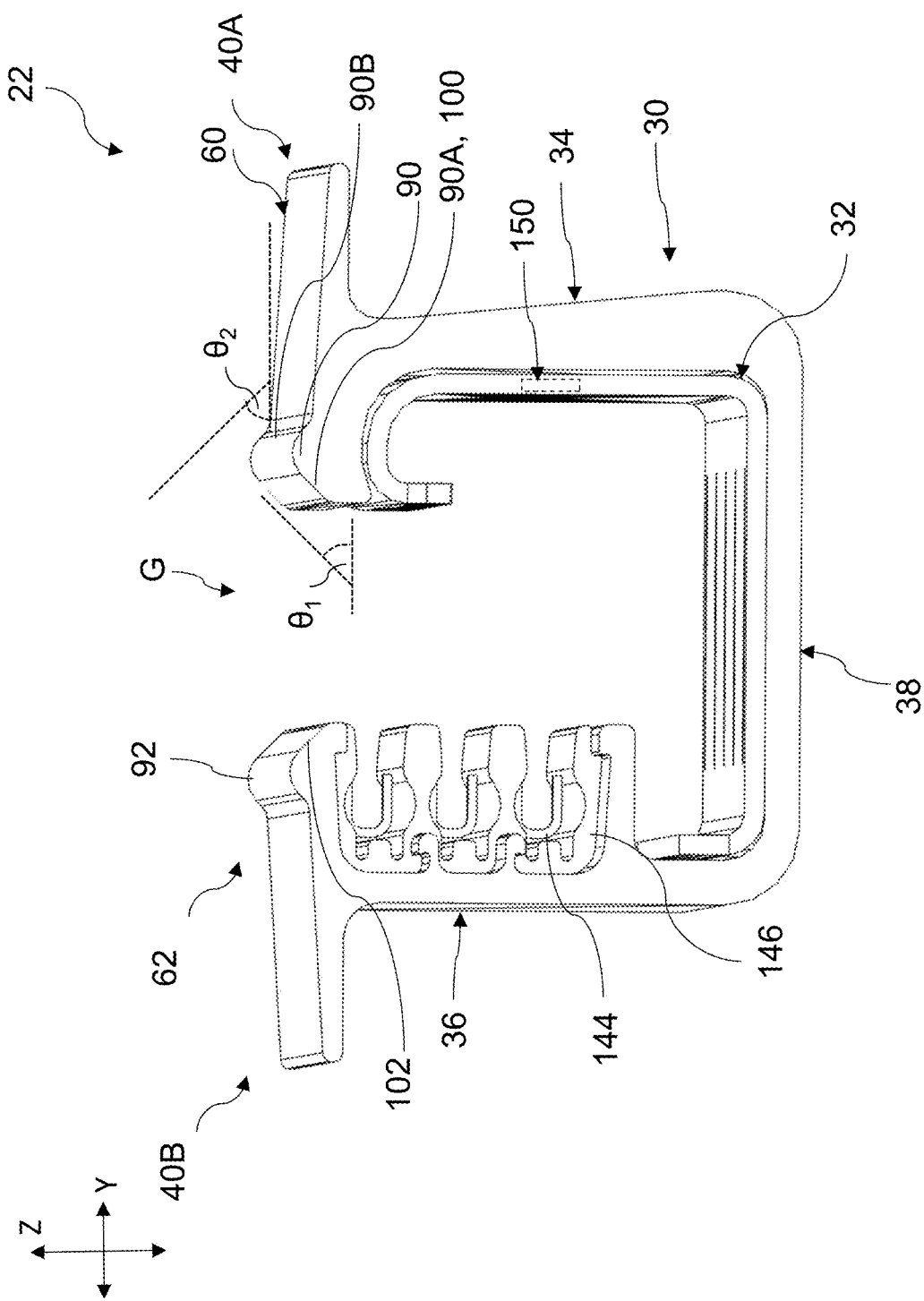
FIG. 3A is a perspective view generally illustrating an embodiment of a track assembly according to teachings of the present disclosure.

With embodiments, such as generally illustrated in FIG. 3A, the first track 30 of the track assembly 22 may be configured as an outer track and may include a first rolling portion 60 and/or a second rolling portion 62. Top surfaces 40A, 40B of the first track 30 may be substantially planar and/or may include the first rolling portion 60 and the second rolling portion 62, respectively. The first rolling portion 60 and the second rolling portion 62 may extend substantially in an X-direction and/or may be separated from each other in the Y-direction, such as by a gap G in the first track 30 between the top surfaces 40A, 40B. The first rolling portion 60 and the second rolling portion 62 may be substantially parallel to and/or at an acute angle to (e.g., angling down and away from the middle of the first track 30) an X-Y plane The gap G may be configured to at least partially receive portions of the support assembly 24, such as, for example and without limitation, an engagement portion 70 of a support member 26 (see, e.g., FIGS. 3B and 3C). Rolling members 50 may be configured to roll along the first rolling portion 60 and/or the second rolling portion 62. Rolling members 50 connected to the same side of a support member 26 may roll along the same rolling portion 60, 62 (see, e.g., FIG. 2).

Figure 3B:
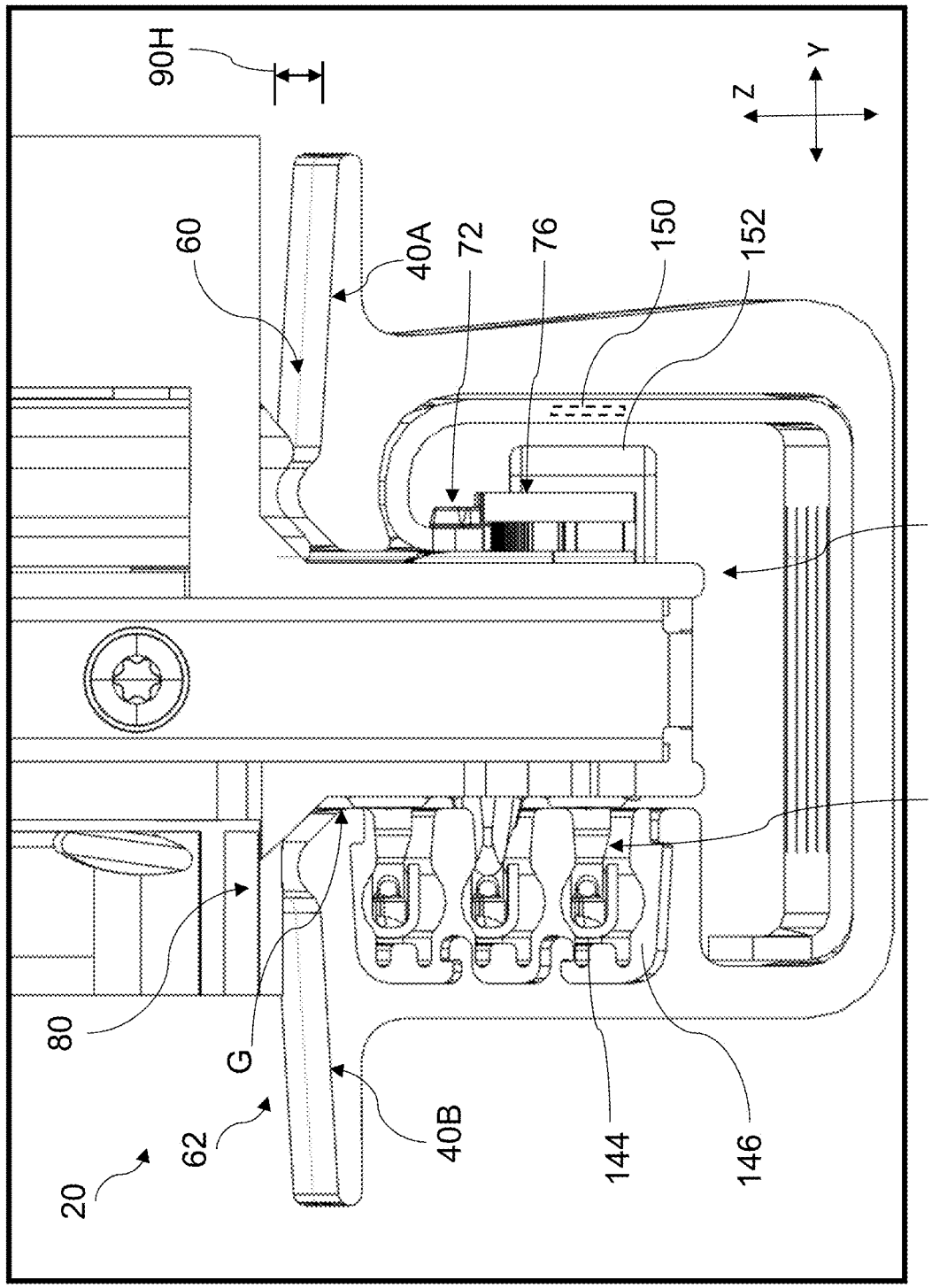
FIG. 3B is a partial perspective view generally illustrating an embodiment of a track system according to teachings of the present disclosure.
Figure 3C:
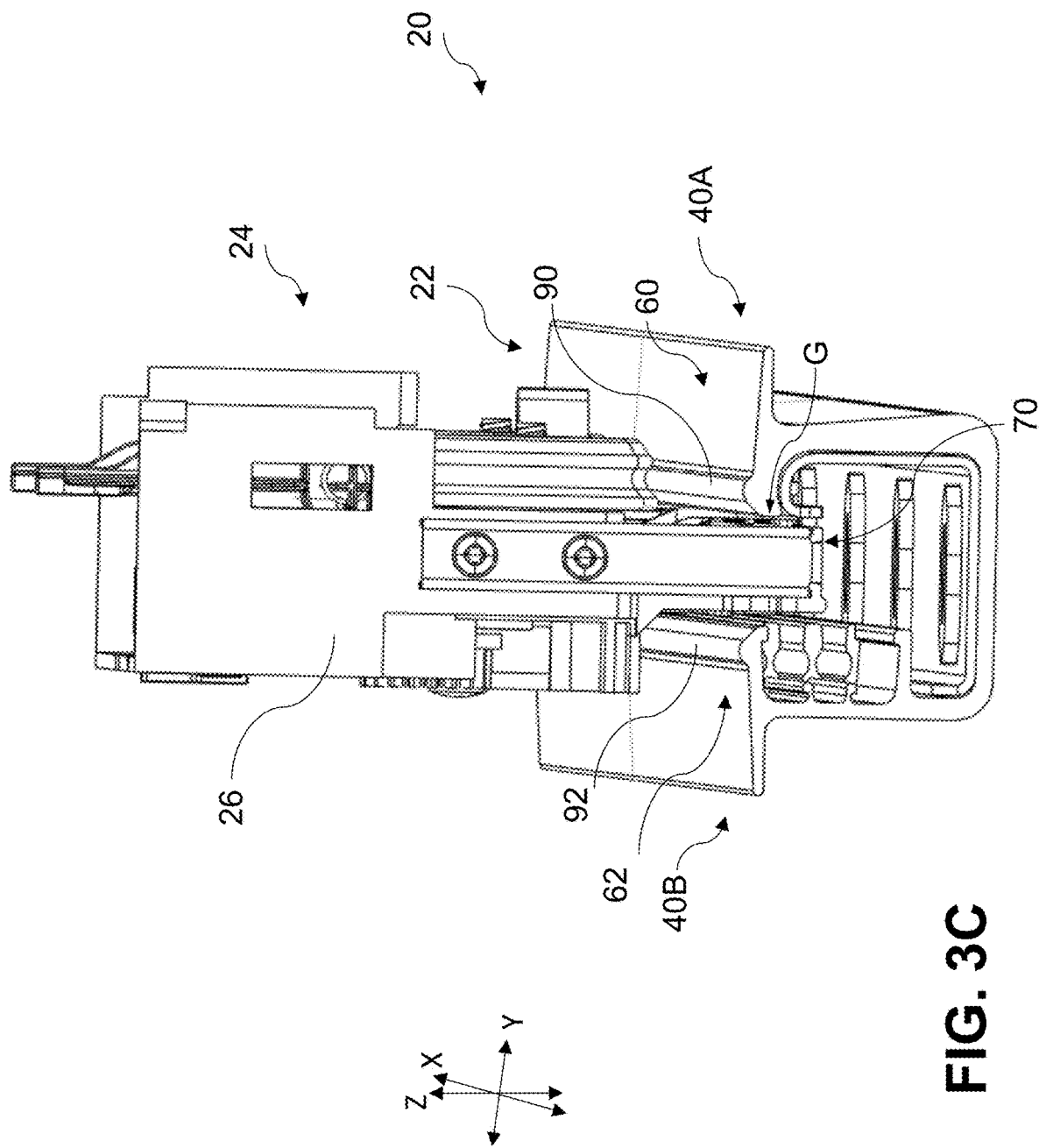
FIG. 3C is a perspective view generally illustrating an embodiment of a track system according to teachings of the present disclosure.
Figure 3D:
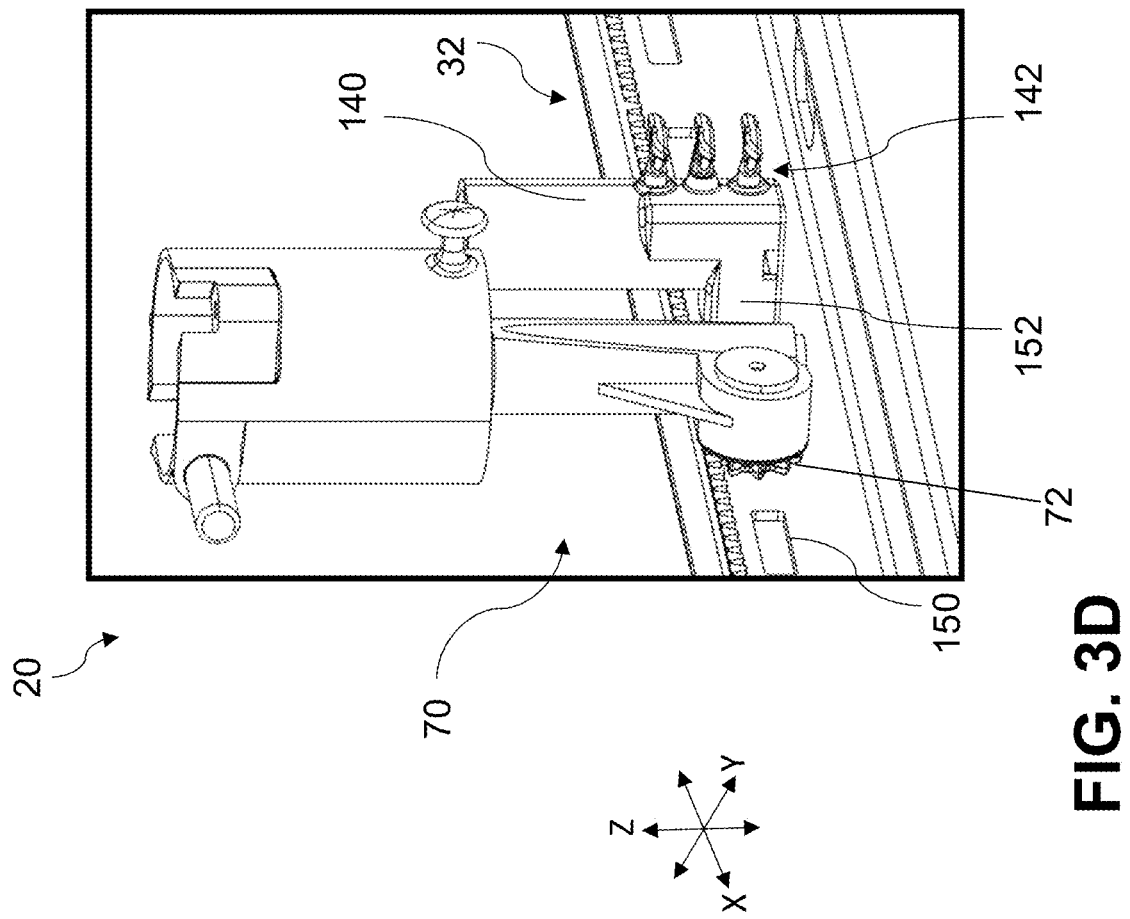
FIG. 3D is a partial perspective view generally illustrating an embodiment of a track system according to teachings of the present disclosure.

In embodiments, such as generally illustrated in FIGS. 3B and 3D, an engagement portion 70 of a support member 26 may, for example and without limitation, include a pinion 72, which may be connected to a motor 74 and/or may be configured to engage teeth of the second track 32 to move/adjust the support member 26 along the track assembly 22. Additionally or alternatively, an engagement portion 70 may include an anchor 76 that may selectively engage the second track 32 to restrict/lock movement (e.g., X-direction movement, Y-direction movement, Z-direction movement) of the support assembly 24 relative to the track assembly 22 (see, e.g., FIGS. 2 and 3B).

In embodiments, such as generally illustrated in FIGS. 3A-6B, a rolling portion 60, 62 of a track 30 may include a ridge or protrusion 90, 92 that may extend generally upward in a Z-direction and/or substantially perpendicular to the rolling portion 60, 62. A ridge 90, 92 may extend along some or all of a length of a first track 30 (e.g., in the X-direction). The first rolling portion 60 may include a first ridge 90 and/or the second rolling portion 62 may include a second ridge 92 that may extend substantially parallel to the first ridge 90. The ridges 90, 92 may be disposed at or about inner portions of the rolling portions 60, 62, such as proximate and/or adjacent the gap G. The ridges 90, 92 may, for example, be rounded. Sides 90A, 90B of a ridge 90 may include a first ridge angle $\theta_1$ and a second ridge angle $\theta_2$, respectively. The angles $\theta_1$, $\theta_2$ may, for example, be oblique angles relative to a Z-direction and/or a Y-direction.

With embodiments, such as generally illustrated in FIG. 3B, one or more rolling members 50 may be connected to a first side of a support member 26 to engage one of the rolling portions 60, 62 of a track 30. A second side of the support member 26 may be configured to contact and/or engage the other rolling portion 62, 60 of the track 30. For example and without limitation, a support member 26 may include one or more sliding portions 80 (e.g., non-rotating portions) that may, at least in some circumstances (e.g., with heavy loads connected to the support member 26), contact a rolling portion 60 (e.g., a ridge 90, 92) of a track 30, such as to support the support assembly 24 and/or to limit movement (e.g., tilting) of the support assembly 24 relative to the track assembly 22. The one or more sliding portions 80 may, for example, include a material (e.g., plastic, a polymer, etc.) that may be different than the first track 30. The material(s) of the one or more sliding portions 80 may, with examples, be a low-friction material configured to limit frictional forces between the sliding portions 80 and a ridge 90, 92.

With embodiments, such as generally illustrated in FIG. 3A, the first track 30 may include one or more tapered portions 100, 102. For example and without limitation, top surfaces 40A, 40B of the first track 30 may include a first tapered portion 100 and a second tapered portion 102, respectively. The first tapered portion 100 may be disposed proximate, extend from, and/or be part of the first ridge 90 (e.g., may be part of a side 90A of the first ridge 90). The second tapered portion 102 may be disposed proximate and/or extend from the second ridge 92. The tapered portions 100, 102 may extend generally inward and/or downward (e.g., generally toward each other and a bottom of the track 30).

In embodiments, a rolling member 50 may include one or more of a variety of shapes, sizes, configurations, and/or materials. With embodiments, such as generally illustrated in FIGS. 7-9B, a rolling member 50 may be substantially annular and/or may include a generally conical and/or grooved configuration. A rolling member 50 may include a first portion 110 and/or a second 112 portion that may be separated (e.g., in an axial direction, which may be substantially parallel to a Y-direction) by a groove 114 (e.g., a circumferential groove). The first portion 110 and/or the second portion 112 may be substantially conical. The first portion 110 may be disposed axially inward of the second portion 112. A maximum outer diameter 110M of the first portion 110 may, for example, be greater than a maximum outer diameter 112M of the second portion 112 (see, e.g., FIG. 8). The outer diameter of the rolling member 50 may generally decrease in the first portion 110, such as in a direction away from the support member 26 and/or toward the second portion 112. The outer diameter of the rolling member 50 may generally decrease in the second portion 112, such as in a direction away from the support member 26 and/or the first portion 110 (e.g., an axial or Y-direction). The groove 114 may include a minimum diameter 114D that may, for example, be smaller than the minimum outer diameter 110D of the first portion 110 and/or that may be greater than the minimum outer diameter 112D of the second portion 112.

With embodiments, such as generally the first portion 110 may include and/or taper at a first portion angle $\theta_3$, and/or the second portion 112 may include and/or taper at a second portion angle $\theta_4$. The first portion angle $\theta_3$, for example, may correspond to the angle $\theta_1$ of a first side 90A of a ridge 90 of a top surface 40A, 40B of a first track 30, and/or the second portion angle $\theta_4$, for example, may correspond to the angle $\theta_2$ of a second side 90B of the ridge 90. For example and without limitation, the ridge angles $\theta_1$, $\theta_2$, the first portion angle $\theta_3$, and the second portion angle $\theta_4$ may be configured to facilitate symmetrical contact of the rolling member 50 with the ridge 90. With embodiments, outer portions 120, 122 of the first portion 110 and/or the second portion 112 (e.g., proximate maximum outer diameters 110M, 112M) may, for example, be rounded.

In embodiments, such as generally illustrated in FIG. 8, the first portion 110, the second portion 112 and/or the groove 114 may include different axial extents. For example and without limitation, an axial extent 110A of the first portion 110 may be greater than an axial extent 114A of the groove 114, and/or an axial extent 112A of the second portion 112 may be greater than the axial extent 110A of the first portion 110. A radial extent 114R (e.g., a depth) of the groove 114 may correspond to (e.g., be substantially the same as, larger than, smaller than, etc.) a height 90H, 92H of a ridge 90, 92.

Figure 10:
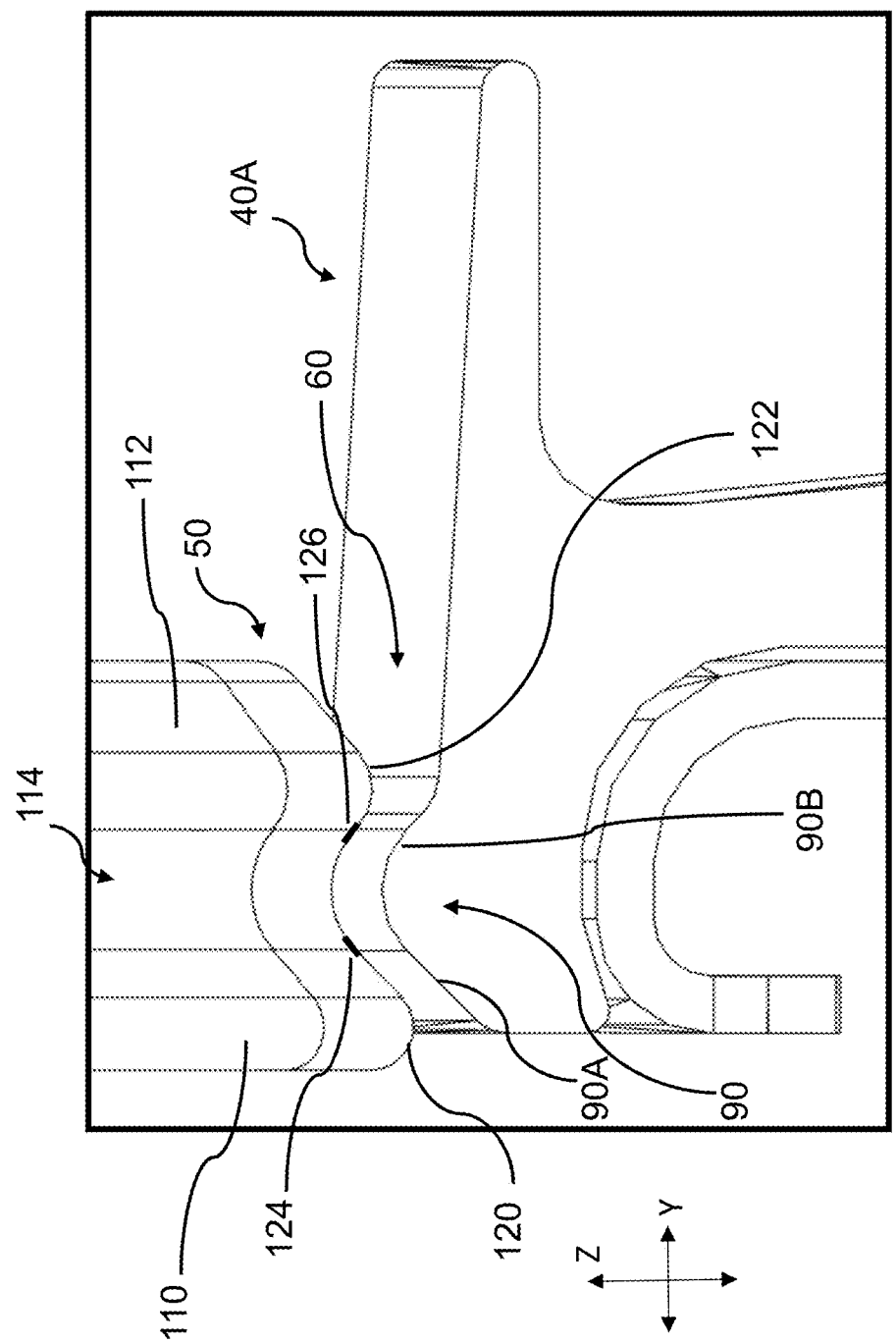
FIG. 10 is an enlarged partial perspective view generally illustrating portions of embodiments of a track assembly and a rolling member of a track system according to teachings of the present disclosure.

In embodiments, such as generally illustrated in FIG. 10, a rolling member 50 may be configured to engage a track (e.g., a ridge 90 of a second track 30). The rolling member 50 and the ridge 90 may be configured such that rolling member 50 contacts the ridge 90 in a substantially symmetrical manner, which may include a first portion 110 of the rolling member 50 contacting the ridge 90 in a first contact region 124, and/or a second portion 112 of the rolling member 50 contacting the ridge 90 in a second contact region 126. The first contact region 124 and the second contact region 126 may, for example, be disposed at substantially the same location on opposite sides of the ridge 90.

In embodiments, such as generally illustrated in FIG. 10, as a support member 26 moves along a track assembly 22, a first portion 110 of a rolling member 50 may be in contact (e.g., substantially parallel contact) with a tapered portion 100, 102 of a top surface 40A, 40B of a first track 30, a groove 114 of the rolling member 50 may at least partially receive a ridge 90, 92 of the top surface 40A, 40B of the first track 30, and/or an outer portion 122 of the second portion 112 may contact an outer portion of the ridge 90 and/or the rolling portion 60, 62. At least some of the second portion 112 may, at least in some circumstances, not be in contact with a rolling portion 60, 62 of the first track 30. Contact between the first portion 110 and a tapered portion 100, 102 and/or engagement between the groove 114 and the ridge 90, 92 may restrict relative movement between the support assembly 24 and the track assembly 22, such as in a Y-direction, in a Z-direction, and/or tilting (e.g., about an axis that may be substantially parallel with an X-direction).

Figure 5:
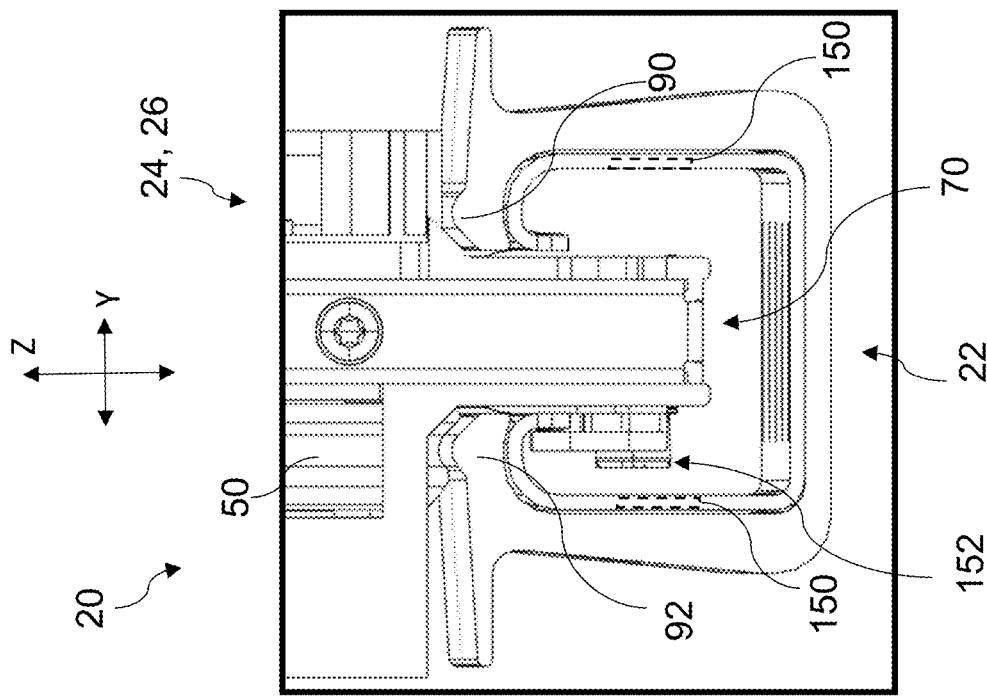
FIGS. 4 and 5 are partial perspective views generally illustrating embodiments of track systems according to teachings of the present disclosure.
Figure 4:
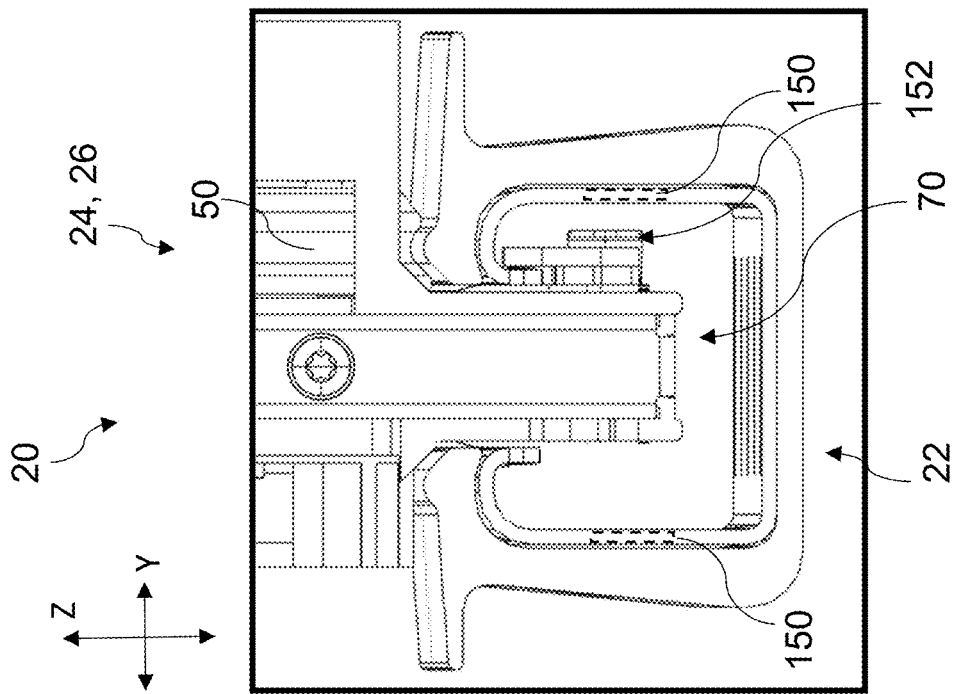

In embodiments, such as generally illustrated in FIGS. 4 and 5, a first track 30 may include a first ridge 90 and a second ridge 92. Rolling members 50 of a support member 26 may, in some circumstances, only engage one of the two ridges 90, 92 at a time (e.g., if the rolling members 50 are connected to and/or disposed at the same side of a support member 26). If a support assembly 24 is connected in a first configuration (e.g., a forward configuration), such as generally illustrated in FIG. 4, the rolling member(s) 50 may engage the first ridge 90. If a support assembly 24 is connected to a track assembly 22 in a second configuration (e.g., a rearward configuration), such as generally illustrated in FIG. 5, the rolling member(s) 50 may engage the second ridge 92. For example and without limitation, a support assembly 24 (and/or support members 26 thereof) may be connected in a forward configuration and in a rearward configuration with the same track assembly 22.

While two rolling members (e.g., rolling members 50, 50') are described with some embodiments of support members 26, such embodiments and other embodiments may include other numbers of rolling members 50 (e.g., fewer, additional, etc.) and rolling members 50 may be connected in one or more of a variety of other configurations (e.g., on both sides of a support member 26).

In embodiments, such as generally illustrated in FIGS. 6A and 6B, a support assembly 24 may include a first support member 26 and a second support member 26', and/or a track system 20 may include a first track assembly 22 and a second track assembly 22'. The first support member 26 may be connected to the second support member 26' via a cross member 130 and/or a component 42. The first support member 26 and/or the second support member 26' may move substantially together along the first track assembly 22 and the second track assembly 22'. The first support member 26 and the second support member 26' may be configured for connection with, movement along, and/or removal from both of the first track assembly 22 and the second track assembly 22'. For example and without limitation, in a first/forward configuration, the first support member 26 may be connected with the first track assembly 22, and the second support member 26' may be connected with the second track assembly 22' (see, e.g., FIG. 6A). In the first configuration, one or more rolling members 50 of the first support member 26 may be engaged with a first ridge 90 of the first track assembly 22, and/or one or more rolling members 50" of the second support member 26' may be engaged with a first ridge 90' of the second track assembly 22'. Additionally or alternatively, in a second configuration, the first support member 26 may be connected with the second track assembly 22' and the second support member 26' may be connected with the first track assembly 22 (see, e.g., FIG. 6B). In the second configuration, one or more rolling members 50 of the first support member 26 may be engaged with a first ridge 90' of the second track assembly 22', and/or one or more rolling members 50" of the second support member 26' may be engaged with a first ridge 90 of the first track assembly 22.

With embodiments, rolling members 50, 50' 50" of the first support member 26 and the second support member 26', some or all of which may include a grooved and/or conical configuration, may cooperate to limit movement of the support assembly 24, such as in a Y-direction and/or a Z-direction.

In some embodiments, such as generally illustrated in FIGS. 6A and 6B, track assemblies 22, 22' may be disposed in a mirrored configuration. With a mirrored configuration of the track assemblies 22, 22', the support members 26, 26' may be disposed such that rolling members 50, 50', 50" are disposed at outer sides (or inner sides) of the support members 26, 26'. In some circumstances, one or more rolling members 50, 50' of the first support member 26 may restrict movement of the support assembly 24 in a first Y-direction (e.g., via contact between a first portion 110 of a rolling member 50, 50' and a tapered portion 100 of the first track assembly 22) to a greater degree than a second Y-direction, and/or one or more rolling members 50" of the second support member 26' may restrict movement of the support assembly 24 in the second Y-direction (e.g., via contact between a first portion 110 of a rolling member 50" and a tapered portion 100' of the second track assembly 22'), to a greater degree than the first Y-direction. The first Y-direction may be substantially opposite the second Y-direction. The one or more rolling members 50" may include a grooved and/or conical configuration that may be substantially the same as a grooved and/or conical configuration of a rolling member 50, 50'.

While one or two track assemblies (e.g., track assemblies 22, 22') are described with some embodiments, such embodiments and other embodiments may include one or more additional track assemblies.

With embodiments, such as generally illustrated in FIGS. 3B and 3D, an engagement portion 70 of a support member 26 may include an electrical connector 140. The electrical connector 140 may include one or more contacts 142 configured to electrically connect a support assembly 24 with a track assembly 22. The electrical connector 140 may rotate (e.g., about a Z-direction) such that the electrical contact(s) 142 move into and out of electrical contact with one or more conductors 144 of the track assembly 22. The one or more conductors 144 may be disposed at least partially in one or more insulators 146 that may electrically insulate the one or more conductors 144 from the first track 30.

Figure 11:
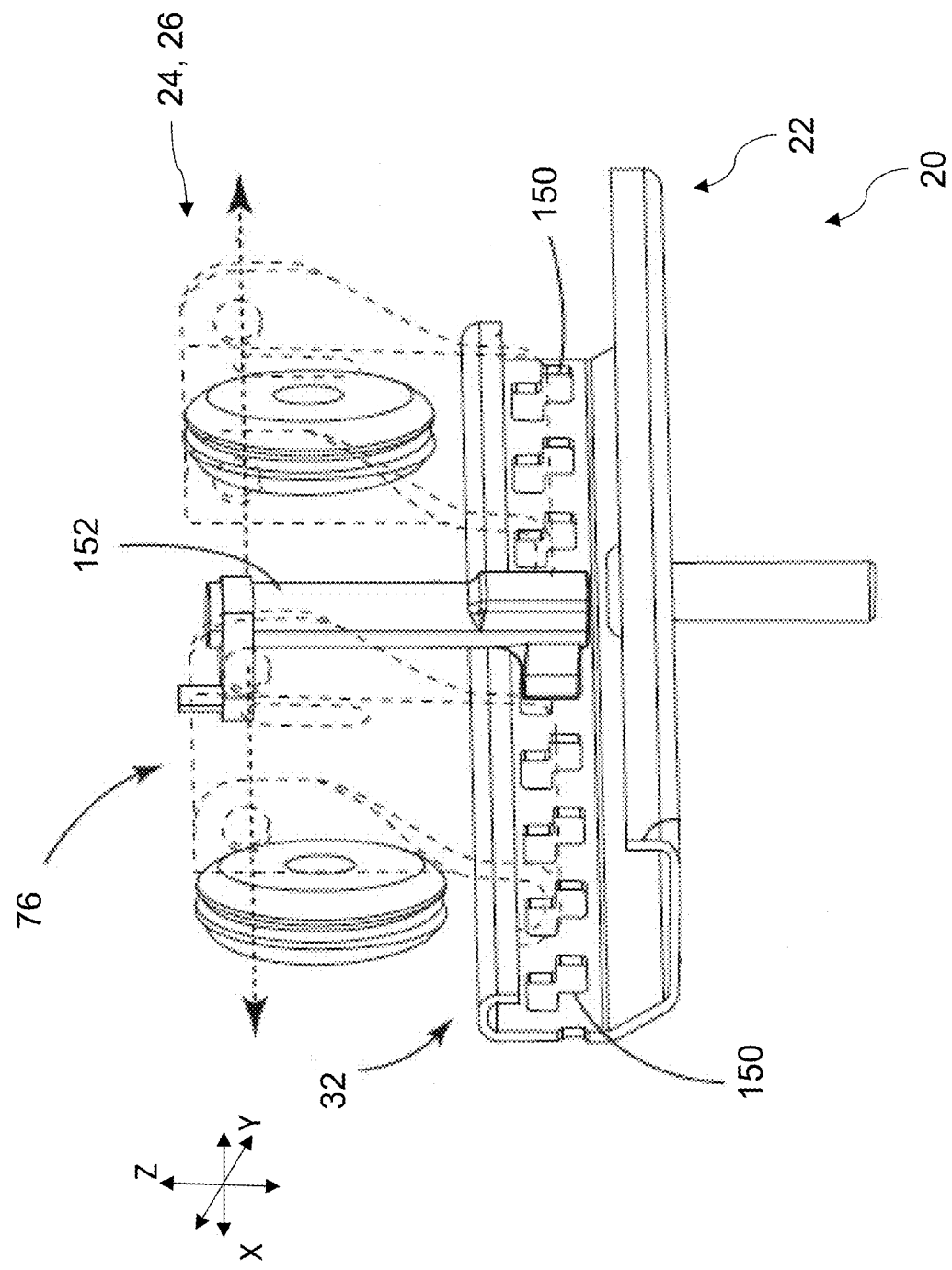
FIG. 11 is a perspective view generally illustrating portions of embodiments of a track assembly and a support member of a track system according to teachings of the present disclosure.

In embodiments, such as generally illustrated in FIG. 11 (and FIG. 3B), a track (e.g., a second track 32) of a track system 20 may include one or more features 150. The one or more features 150 may, or example and without limitation, include recesses, apertures, projections, printed code, magnets, and/or coils (e.g., to generate/modify a magnetic field), among others. The one or more features 150 may be disposed along the second track 32, such as in an X-direction.

With embodiments, a support member 26 may include one or more sensors 152. A sensor 152 may be configured to sense one or more features 150 of a track (e.g., the second track 32) of a track assembly 22. For example and without limitation, with features 150 that include apertures, the one or more sensors 152 may be configured to sense the lack of track material where the apertures are present and/or sense the presence of the second track 32 where the apertures are not present (e.g., may include/be configured as a Hall effect sensor). In embodiments, the one or more sensors 152 may be utilized in determining a position/location of a support assembly 24 relative to a track assembly 22. The one or more sensors 152 may, for example and without limitation, be connected to and/or incorporated with the electrical connector 140 such that the one or more sensors 152 may rotate with the electrical connector 140. The one or more sensors 152 may be disposed opposite the one or more contacts 142.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or nonfunctional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A support member configured for selective connection with and removal from track assemblies, the support member comprising:
   a body; and
   a rolling member rotatably connected to the body to facilitate movement of the support member along a track;
   wherein the rolling member includes a grooved configuration to limit movement of the support member relative to said track in a Y-directions;
   the rolling member includes a groove configured to engage a protrusion or ridge of said track; and
   the rolling member includes a first portion and a second portion separated in an axial direction of the rolling member by the groove.

2. The support member of claim 1, wherein the rolling member is monolithic.

3. The support member of claim 1, wherein a first portion of the rolling member includes a first portion angle that corresponds to a ridge angle of a side of said ridge of said track.

4. The support member of claim 1, wherein a maximum outer diameter of the first portion is greater than a maximum outer diameter of the second portion.

5. The support member of claim 4, wherein the second portion is disposed axially outward of the first portion.

6. The support member of claim 1, wherein the first portion and the second portion are configured for symmetrical contact with respective sides of said protrusion or ridge of said track.

7. The support member of claim 1, wherein a minimum diameter of the groove is greater than a minimum diameter of the second portion.

8. The support member of claim 7, wherein a minimum diameter of the first portion is greater than the minimum diameter of the groove; and
   a maximum diameter of the second portion is greater than the minimum diameter of the first portion.

9. The support member of claim 1, wherein the first portion includes a first portion angle;
   the second portion includes a second portion angle; and
   the first portion angle and the second portion angle are configured to facilitate symmetrical contact of the rolling member with sides of said protrusion or ridge of said track.

10. A track system, comprising:
    the support member of claim 1; and
    a track assembly, including:
    the track;
    a second track;
    wherein the second track is disposed at least partially within the track;
    the support member is configured to roll along the track via the rolling member; and
    the support member includes an engagement portion configured to engage the second track to adjust and lock a position of the support member relative to the track assembly in a longitudinal direction of the track assembly.

11. A track system, comprising:
    the support member of claim 1; and
    the track;
    wherein the support member includes a sensor configured to sense features of the track to facilitate a determination of a position of the support member relative to the track.

12. A track system, comprising:
    a support assembly, including:
    the support member of claim 1; and
    a second support member connected with the support member via a cross member;
    a first track assembly including the track; and
    a second track assembly;
    wherein the support member and the second support member are both configured for connection with and removal from the first track assembly and the second track assembly.

13. The track system of claim 12, wherein the second support member includes a second rolling member having a second grooved configuration to limit movement of the second support member in the Y-direction.

14. The track system of claim 13, wherein the grooved configuration and the second grooved configuration are substantially the same.

15. The track system of claim 13, wherein:
    (i) the rolling member is disposed at an outer side of the support member, and
    the second rolling member is disposed at an outer side of the second support member; or
    (ii) the rolling member is disposed at an inner side of the support member, and
    the second rolling member is disposed at an inner side of the second support member.

16. The support member of claim 1, wherein the groove defines a generally U-shaped profile and opens in a radial direction of the rolling member.

17. A track system, comprising:
    the support member of claim 1; and
    the track;
    wherein the track includes a top surface having a rolling portion; and
    the protrusion or ridge of the track extends substantially perpendicular to the rolling portion.

18. The support member of claim 1, wherein:
a region of the first portion configured to contact said ridge extends at a first portion angle;
a region of the second portion configured to contact said ridge extends at a second portion angle; and
the first portion angle and the second portion angle are different.

19. The support member of claim 1, wherein:
the first portion has a first axial extent;
the second portion has a second axial extent;
the groove has a third axial extent; and
the first axial extent, the second axial extent, and the third axial extent are different.

20. A support member configured for selective connection with and removal from track assemblies, the support member comprising:
a body; and
a rolling member rotatably connected to the body to facilitate movement of the support member along a track;
wherein the rolling member includes a grooved configuration to limit movement of the support member relative to said track in a Y-direction;
the rolling member includes a groove configured to engage a protrusion or ridge of said track;
the rolling member includes a first portion and a second portion separated in an axial direction by the groove;
a minimum diameter of the groove is greater than a minimum diameter of the second portion;
a minimum diameter of the first portion is greater than the minimum diameter of the groove; and
a maximum diameter of the second portion is greater than the minimum diameter of the first portion.

* * * * *